US007248936B1

(12) United States Patent
Holmes et al.

(10) Patent No.: US 7,248,936 B1
(45) Date of Patent: Jul. 24, 2007

(54) AUTOMATED TOOL RECIPE VERIFICATION AND CORRECTION

(75) Inventors: Timothy L. Holmes, Newburgh, NY (US); Susan M. Cianfrani, Poughkeepsie, NY (US); Roger M. Young, Warwick, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/307,293

(22) Filed: Jan. 31, 2006

(51) Int. Cl.
   *G06F 19/00* (2006.01)
(52) U.S. Cl. .................. 700/97; 700/105; 717/126
(58) Field of Classification Search ............ 700/95–97, 700/103–105, 110; 716/4, 5; 707/203; 717/126, 717/168–178
   See application file for complete search history.

(56) References Cited

U.S. PATENT DOCUMENTS

| 6,035,293 | A * | 3/2000 | Lantz et al. ................. 707/1 |
| 6,415,193 | B1 * | 7/2002 | Betawar et al. .............. 700/97 |
| 6,430,572 | B1 * | 8/2002 | Steffan et al. ........... 707/104.1 |
| 6,465,263 | B1 * | 10/2002 | Coss et al. .................... 438/14 |
| 6,625,513 | B1 | 9/2003 | Lymberopoulos et al. |
| 6,650,958 | B1 | 11/2003 | Balazs et al. |
| 6,708,074 | B1 | 3/2004 | Chi et al. |
| 6,735,493 | B1 * | 5/2004 | Chou et al. ................. 700/121 |
| 6,898,471 | B1 * | 5/2005 | Sun et al. ..................... 700/96 |
| 2002/0183950 | A1 * | 12/2002 | Fu et al. ....................... 702/84 |
| 2002/0193902 | A1 | 12/2002 | Shanmugasundram et al. |
| 2003/0204281 | A1 * | 10/2003 | Su et al. ..................... 700/108 |
| 2004/0078107 | A1 | 4/2004 | Chou et al. |
| 2004/0203321 | A1 | 10/2004 | Tsuchiyama et al. |
| 2005/0143853 | A1 | 6/2005 | Akimori et al. |

\* cited by examiner

*Primary Examiner*—M. N. Von Buhr
(74) *Attorney, Agent, or Firm*—Lisa U. Jaklitsch; Hoffman, Warnick & D'Alessandro LLC

(57) ABSTRACT

Automated tool recipe verification and correction are disclosed. A tool recipe is intercepted during uploading or downloading of the tool recipe. A determination whether an associated parameter verification set (PVS) template for the tool recipe exists is performed, and if it exists, a determination whether to verify the tool recipe is performed. Each parameters of the tool recipe having an auditable corresponding parameter is compared to the auditable corresponding parameter of the associated PVS template. Where no non-matching parameter sets exist, the tool recipe is verified; otherwise, a determination as to whether of all of the non-matching parameter sets are indicated as modifiable in the associated PVS template is made. If all of the parameters of the non-matching parameter sets are modifiable, then they are modified to match the respective auditable corresponding parameter and the tool recipe is verified, otherwise, the verification is inhibited.

20 Claims, 3 Drawing Sheets

AUTOMATED TOOL RECIPE VERIFICATION AND CORRECTION

BACKGROUND OF THE INVENTION

1. Technical Field

The invention relates generally to manufacturing control, and more particularly, to automated tool recipe verification and correction.

2. Background Art

Tool control in a manufacturing facility is important to maintain quality and efficiency. In many areas of manufacturing, tool control is achieved via computers which are in turn controlled by instructions commonly referred to as tool recipes. For example, in the semiconductor fabrication industry, various tools for processing product and/or measuring product are controlled by tool recipes. Each tool recipe may include thousands of parameters that instruct the tool on how to operate. In many cases, production tools can produce many different products by simply running a unique tool recipe, which gives the production tool flexibility. However, the use of tool recipes to achieve flexibility also creates a need to verify that the tool recipes used by the tools are written correctly. If the tool recipes are incorrect, products may be damaged or, in many cases, scrapped due to incorrect processing or measurement.

In one approach, a tool recipe is audited by comparing the tool recipe to a pre-determined reference recipe. U.S. Pat. No. 6,650,958 and U.S. patent application Publication No. 2004/0078107 disclose varieties of this approach. Shortcomings of this type of approach, however, include inapplicability to tool recipes that are downloaded from a recipe management system, and need for manual corrections to the tool recipes.

In view of the foregoing, there is a need for a solution to verify tool recipes that does not suffer from the problems of the related art.

SUMMARY OF THE INVENTION

Automated tool recipe verification and correction are disclosed. A tool recipe is intercepted during uploading or downloading of the tool recipe. A determination whether an associated parameter verification set (PVS) template for the tool recipe exists is performed, and if it exists, a determination as to whether it includes an auditable corresponding parameter for a parameter in the tool recipe is made. If an auditable corresponding parameter exists, a determination whether to verify the tool recipe is performed. Each parameter of the tool recipe having an auditable corresponding parameter is compared to the auditable corresponding parameter of the associated PVS template. Where no non-matching parameter sets exist, the tool recipe is verified; otherwise, a determination as to whether all of the non-matching parameter sets are indicated as modifiable in the associated PVS template is made. If all of the parameters of the non-matching parameter sets are modifiable, then they are modified to match the respective auditable corresponding parameter and the tool recipe is verified, otherwise, the verification is inhibited. Hence, the tool recipe can be verified to be correct and automatically corrected before it is uploaded/downloaded or even used by the production tool.

A first aspect of the invention provides a method of verifying a tool recipe, the method comprising the steps of: intercepting the tool recipe during an uploading of the tool recipe from a tool recipe creator or a downloading of the tool recipe from a recipe management system, wherein the tool recipe includes at least one parameter; determining whether an associated parameter verification set (PVS) template for the tool recipe exists; in the case that the associated PVS template exists, determining whether the PVS template includes an auditable corresponding parameter for at least one parameter of the tool recipe; in the case that the associated PVS template includes the auditable corresponding parameter, determining whether to verify the tool recipe by: comparing each parameter having an auditable corresponding parameter to the auditable corresponding parameter of the associated PVS template to determine whether any non-matching parameter sets exist, verifying the tool recipe in the case that no non-matching parameter sets exist, determining, in the case that at least one non-matching parameter set exists, whether the parameter of all of the non-matching parameter sets are indicated as modifiable in the associated PVS template, and in the case that not all of the parameters of the non-matching parameter sets are modifiable, inhibiting verification of the tool recipe, and modifying, in the case that all of the parameters of the non-matching parameter sets are modifiable, all the parameters of the non-matching parameter sets to match the auditable corresponding parameter and verifying the tool recipe.

A second aspect of the invention provides a system for verifying a tool recipe, the method comprising the steps of: an interceptor for intercepting the tool recipe during an uploading of the tool recipe from a tool recipe creator or a downloading of the tool recipe from a recipe management system, wherein the tool recipe includes at least one parameter; a template determinator for determining whether an associated parameter verification set (PVS) template for the tool recipe exists; an audit determinator for determining, in the case that the associated PVS template exists, whether the associated PVS template includes at least one auditable corresponding parameter; and a verifier for determining whether to verify the tool recipe in the case that the associated PVS template includes the at least one auditable corresponding parameter, by: comparing each parameter having an auditable corresponding parameter to the auditable corresponding parameter of the associated PVS template to determine whether any non-matching parameter sets exist, verifying the tool recipe in the case that no non-matching parameter sets exist, determining, in the case that at least one non-matching parameter set exists, whether the parameter of all of the non-matching parameter sets are indicated as modifiable in the associated PVS template, and in the case that not all of the parameters of the non-matching parameter sets are modifiable, inhibiting verification of the tool recipe, and modifying, in the case that all of the parameters of the non-matching parameter sets are modifiable, all the parameters of the non-matching parameter sets to match the auditable corresponding parameter and verifying the tool recipe.

A third aspect of the invention provides a program product stored on a computer-readable medium, which when executed, verifies a tool recipe, the program product comprising: program code for intercepting the tool recipe during an uploading of the tool recipe from a tool recipe creator or a downloading of the tool recipe from a recipe management system, wherein the tool recipe includes at least one parameter; program code for determining whether an associated parameter verification set (PVS) template for the tool recipe exists; program code for determining whether, in the case that the associated PVS template exists, the associated PVS template includes at least one auditable corresponding parameter; and program code for determining whether to verify the tool recipe in the case that the associated PVS template includes the at least one auditable corresponding parameter, by: comparing each parameter having an auditable corresponding parameter to the corresponding parameter of the associated PVS template to determine whether any non-matching parameter sets exist, verifying the tool recipe in the case that no non-matching parameter sets exist, determining, in the case that at least one non-matching parameter set exists, whether the parameter of all of the non-matching parameter sets are indicated as modifiable in the associated PVS template, and in the case that not all of the parameters of the non-matching parameter sets are modifiable, inhibiting verification of the tool recipe, and modifying, in the case that all of the parameters of the non-matching parameter sets are modifiable, all the parameters of the non-matching parameter sets to match the auditable corresponding parameter and verifying the tool recipe.

A fourth aspect of the invention provides a computer-readable medium that includes computer program code to enable a computer infrastructure to verify a tool recipe, the computer-readable medium comprising computer program code for performing the method steps of the invention.

An fifth aspect of the invention provides a business method for verifying a tool recipe, the business method comprising managing a computer infrastructure that performs each of the steps of the invention; and receiving payment based on the managing step.

A sixth aspect of the invention provides a method of generating a system for verifying a tool recipe, the method comprising: obtaining a computer infrastructure; and deploying means for performing each of the steps of the invention to the computer infrastructure.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Automated tool recipe verification and correction are disclosed. A tool recipe is intercepted during uploading or downloading of the tool recipe. A determination whether an associated parameter verification set (PVS) template for the tool recipe exists is performed, and if it exists, a determination as to whether it includes an auditable corresponding parameter for a parameter in the tool recipe is made. If an auditable corresponding parameter exists, a determination whether to verify the tool recipe is performed. Each parameter of the tool recipe having an auditable corresponding parameter is compared to the auditable corresponding parameter of the associated PVS template. Where no non-matching parameter sets exist, the tool recipe is verified; otherwise, a determination as to whether all of the non-matching parameter sets are indicated as modifiable in the associated PVS template is made. If all of the parameters of the non-matching parameter sets are modifiable, then they are modified to match the respective auditable corresponding parameter and the tool recipe is verified, otherwise, the verification is inhibited. Hence, the tool recipe can be verified to be correct and automatically corrected before it is uploaded/downloaded or even used by the production tool.

Figure 1:
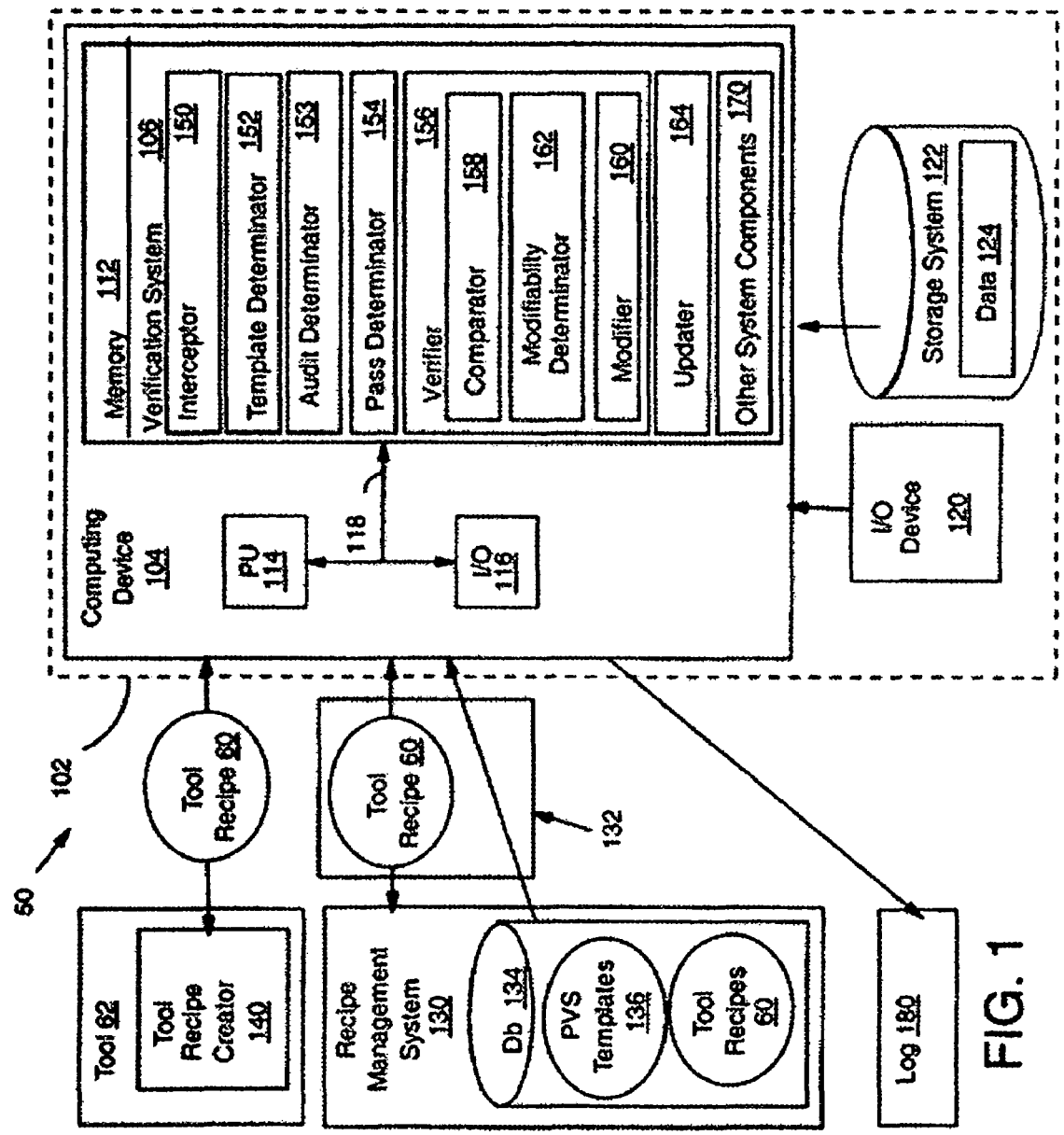
FIG. 1 shows a block diagram of one embodiment of an environment and a verification system according to the invention.
Figure 3:
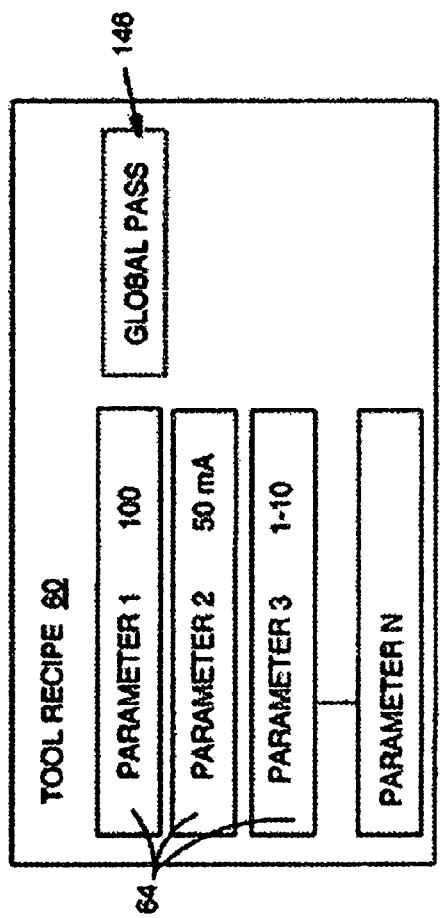
FIG. 3 shows a block diagram of one embodiment of a tool recipe according to the invention.

Turning to the drawings, FIG. 1 shows an illustrative environment 50 for verifying a tool recipe and/or allowing a tool recipe to pass to upload or download. A "tool recipe" 60 as used herein includes instructions for controlling operation of a tool 62. In one embodiment, as shown in FIG. 3, each tool recipe 60 includes at least one parameter 64. Each parameter 64 may vary from tool recipe to tool recipe. Each parameter 64 provides a value or a range of values for a particular feature of tool 62. As such, each tool recipe 60 may include any number of parameters 64, i.e., N is an integer in FIG. 3. In one embodiment, at least one parameter 64 is stated in terms of a range, e.g., parameter 3 has a range of 1–10. A "tool" 62 may be any machine capable of operation according to a tool recipe 60. In one example for the semiconductor fabrication industry, tool 62 may include a photolithography tool in which case a tool recipe 60 may include a number of parameters that set the operation of the photolithography tool such as dose, e.g., dose=10–20 milli-Joules (mJ). "Verification" as used herein means tool recipe 60 is confirmed as correct.

Environment 50 includes a computer infrastructure 102 that can perform the various process steps described herein for verifying tool recipe 60. In particular, computer infrastructure 102 is shown including a computing device 104 that comprises a verification system 106, which enables computing device 104 to verify tool recipe 60 by performing the process steps of the invention.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, PU 114 executes computer program code, such as verification system 106, that is stored in memory 112 and/or storage system 122. While executing computer program code, PU 114 can read and/or write data 124 to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices.

In any event, computing device 104 can comprise any general purpose computing article of manufacture capable of executing computer program code installed by a user (e.g., a personal computer, server, handheld device, etc.). However, it is understood that computing device 104 and verification system 106 are only representative of various possible equivalent computing devices that may perform the various process steps of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques. Computer infrastructure 102 may be implemented as a stand-alone server or computer, a server which is part of another system or even a computer which is part of the tool whose tool recipes are being evaluated.

Figure 4:
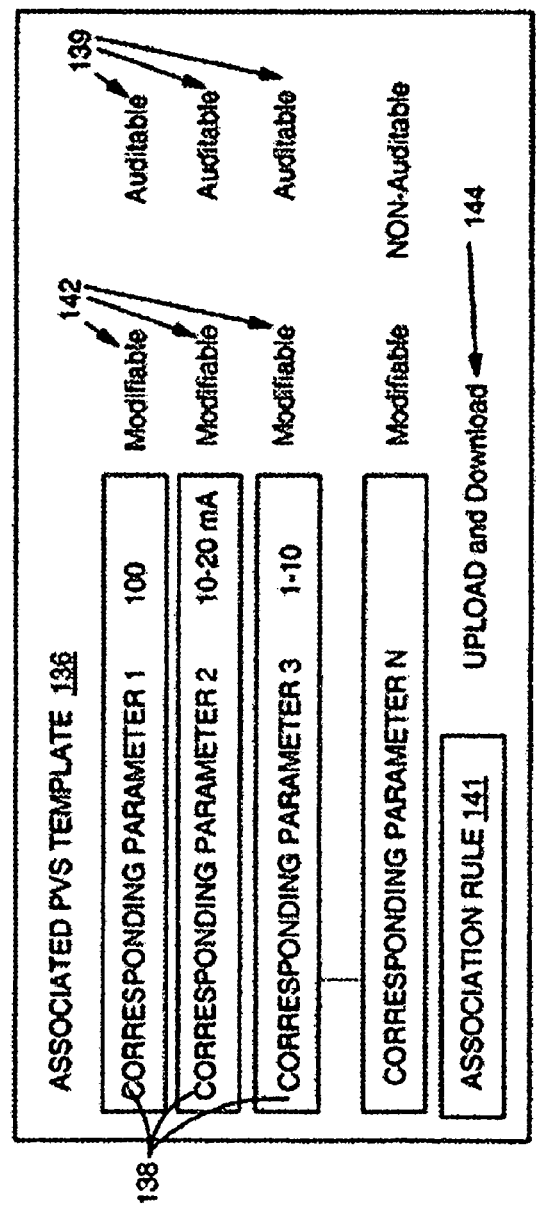
FIG. 4 shows a block diagram of one embodiment of an associated parameter verification set (PVS) template for the tool recipe of FIG. 3 according to the invention.

Computer infrastructure 102 can further comprise a recipe management system (RMS) 130. RMS 130 is shown in communication with computing device 104 over a communications link 132. As discussed above, communications link 132 can comprise any combination of various types of communications links as is known in the art. In one embodiment, RMS 130 comprises a computing device that is in communication with computing device 104 over, for example, a local area network (LAN). Regardless, it is understood that RMS 130 can comprise the same components (processor, memory, I/O interface, etc.) as shown for computing device 104. These components have not been separately shown and discussed for brevity. RMS 130 operates as a repository and management system for tool recipes, i.e., via a database (db) 134, and parameter verification set (PVS) templates 136. As shown in FIG. 4, each "PVS template 136" includes one or more corresponding parameters 138 of a master tool recipe for comparison to one or more parameters 64 of tool recipe 60 to determine whether tool recipe 60 is correct. Each corresponding parameter 138 provides a mandated value or a range of values for a particular feature of tool 62. Note, however, only those corresponding parameters 138 that include an auditable indicator 139 are considered sufficiently relevant to be checked, i.e., audited. That is, not all corresponding parameters 138 within an associated PVS template 136 may require checking. For example, associated PVS template 136 may include hundreds of corresponding parameters 138, and only a subset of corresponding parameters 138 are to be compared to tool recipe 60. The remaining corresponding parameters 138 are dismissed and not checked. Those corresponding parameters 138 having an auditable indicator 139 are referred to herein as "auditable corresponding parameters." Further details of PVS templates 136 will be described below. Although tool recipes 60 and PVS templates 136 are shown in the same database 134, they may be provided in separate storage. Database 134 may include any of the above-described attributes of storage system 122.

Computer infrastructure 102 may further include a log 180, which allows a user to easily determine if any problems exist in the attempted upload/download of a tool recipe 60. Any now known or later developed log management system (not shown) may also be provided to allow a user, for example, to quickly and easily: a) query log 180 and look for specific tool recipe 60 upload/download problems, b) determine what specific tool recipe 60 parameters 64 do not match auditable corresponding parameters 138 of associated PVS template 136 along with tool recipe 60 parameter values and their associated PVS template 136 auditable corresponding parameter values, and c) query log 180 data to obtain previous tool recipe 60 and associated PVS template 136 comparison results.

As shown in FIG. 1, computer infrastructure 102 is capable of handling tool recipe 60 regardless of whether tool recipe 60 is being uploaded or downloaded. For example, a tool recipe 60 may be downloaded from RMS 130 to tool 62 or uploaded to RMS 130 from a tool recipe creator 140. A "tool recipe creator 140" may be any now known or later developed mechanism for creating a new tool recipe 60 and/or modifying an existing tool recipe 60. Although tool recipe creator 140 is shown as part of tool 62, it may be located in alternative locations as those with skill in the art will recognize.

As previously mentioned and discussed further below, verification system 106 enables computing infrastructure 102 to verify tool recipe 60 and/or allow tool recipe 60 to pass to upload or download. To this extent, verification system 106 is shown including an interceptor 150; a template determinator 152; an audit determinator 153; a pass determinator 154; a verifier 156 including a comparator 158, a modifiability determinator 160 and a modifier 162; an updater 164 and other system components 170. Other system components 170 may include any features necessary for operation of verification system 106, but not expressly described herein. Operation of each of these components is discussed further below. However, it is understood that some of the various components shown in FIG. 1 can be implemented independently, combined, and/or stored in memory for one or more separate computing devices that are included in computer infrastructure 102. Further, it is understood that some of the components and/or functionality may not be implemented, or additional systems and/or functionality may be included as part of environment 50.

Figure 2:
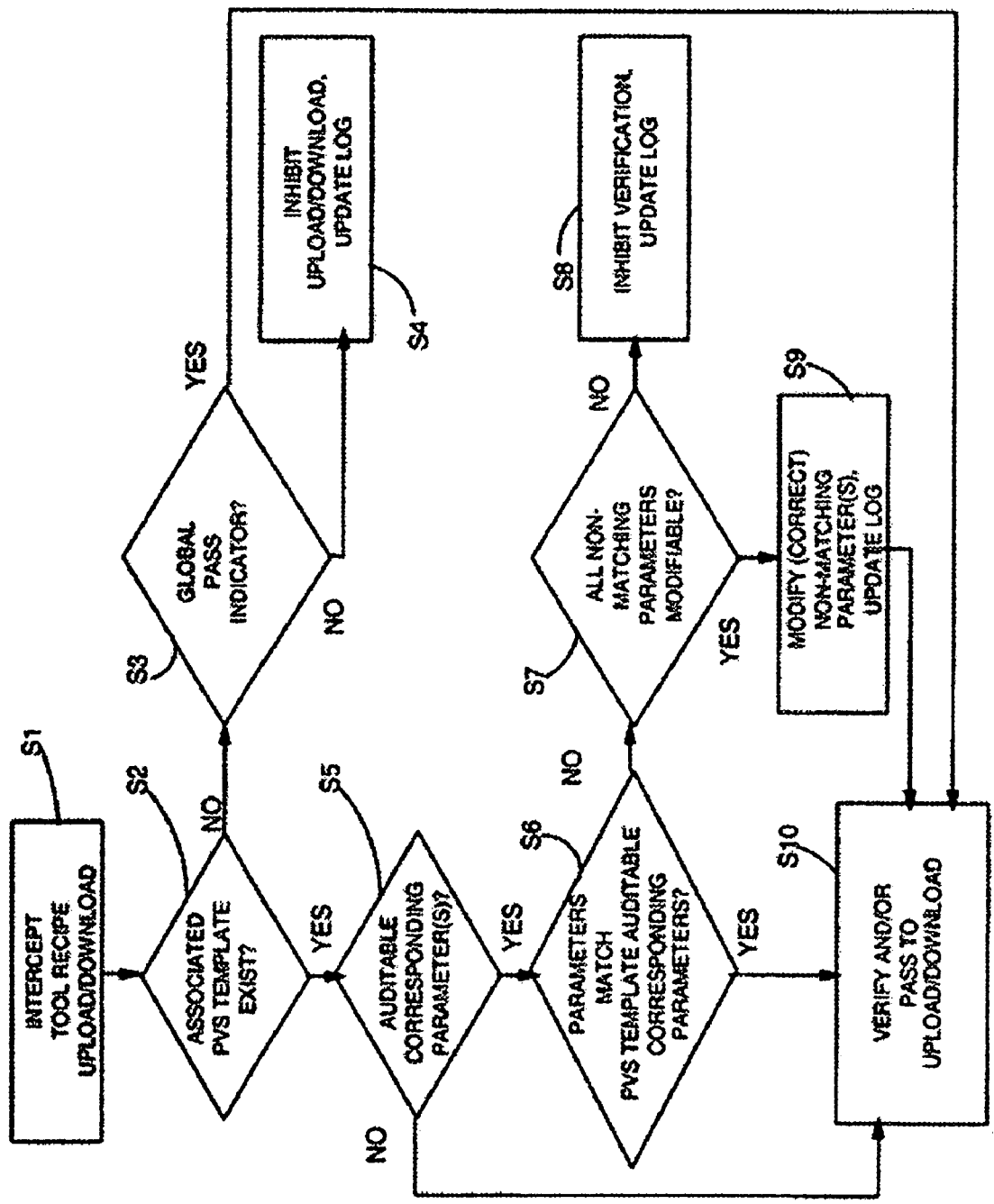
FIG. 2 shows a flow diagram of one embodiment of operational methodology according to the invention.

Turning to FIG. 2 in conjunction with FIG. 1, one embodiment of an operational methodology of verification system 106 will now be described.

In first step S1, interceptor 150 intercepts tool recipe 60 during an uploading of tool recipe 60 from a tool recipe creator 140 or a downloading of tool recipe 60 from RMS 130. Interceptor 150 may be any now known or later developed mechanism for receiving tool recipe 60 as it is passes from one entity to another. For example, interceptor 150 may include any mechanism that can identify tool recipe 60 as such, and receive it.

In a second step S2, template determinator 152 determines whether an associated PVS template 136 exists for tool recipe 60. Template determinator 152 in conjunction with RMS 130 may provide, inter alia, an ability to: a) query PVS templates 136 and determine which tool recipe(s) 60 are associated with which PVS template(s) 136, b) query tool recipes 60 and determine which PVS template(s) 136 are associated with which tool recipe(s) 60, c) place PVS templates 136 in a hierarchy (or priority) so that the highest priority PVS template 136 overrides lower priority templates associated with a tool recipe 60, and d) easily display PVS templates 136 based on specific template characteristics such as technology, product code or any other specific template rule. Each associated PVS template 136 includes an association rule 141 (FIG. 4) to allow PVS template 136 to be associated with a specific tool recipe 60 or recipes, as described above. Association rule 141 may be based on any number of tool recipe characteristics such as: tool recipe 60 name, storage location (such as a directory or folder name), technology, product group, or a combination of the above. PVS template 136 can be generated in many ways. One embodiment may include generating an empty PVS template and entering in the tool recipe 60 parameters 64 manually. This may take a long time depending on the number of parameters 64 that have to be entered in PVS template 136. Another embodiment includes copying an existing PVS template 136 and modifying the existing corresponding parameters 138. In another embodiment, PVS template 136 is generated as an empty template and corresponding parameters 138 are imported from other PVS templates 136 and/or tool recipes 60. Regardless of how PVS template 136 is generated, each PVS template 136 includes, but is not limited to, the following data: a) a corresponding parameter 138 or group of corresponding parameters for each parameter 64 in tool recipe 60, b) for each corresponding parameter 138, an auditability indicator 139 indicating whether parameter 64 in tool recipe 60 corresponding to corresponding parameter 138 is to be evaluated for verification, c) for each corresponding parameter 138, a modifiability indicator 142 indicating whether parameter 64 in tool recipe 60 corresponding to corresponding parameter 138 can be modified, d) an acceptable value or range of acceptable values for the particular parameter, and e) an indicator 144 as to whether the particular PVS template 136 is on upload, on download or both. Whether a parameter 64 can be modified, i.e., whether a corresponding parameter 138 of PVS template 136 indicates whether a parameter can be modified, can be based on a variety of criteria. For example, if a tool 62 cannot vary a particular parameter, a PVS template 136 may indicate the parameter is un-modifiable.

If no associated PVS template 136 exists, i.e., NO at step S2, in step S3, pass determinator 154 determines whether tool recipe 60 includes a global pass indicator 146 (shown in phantom in FIG. 3). A "global pass indicator" 146 indicates that tool recipe 60 is to be passed to uploading or downloading without any verification analysis. In particular, in some instances it may be necessary for a user of verification system 106 and RMS 130 to allow a tool recipe 60 to pass to uploading or downloading without verification versus an associated PVS template 136 and/or no associated PVS template 136 exists. For example, it may be necessary to do this in an emergency where a new tool recipe 60 or correction is necessitated by unexpected product characteristics, however, the product cannot be stored or put on hold. In this case, a user may add a global pass indicator via tool recipe creator 140. If tool recipe 60 includes a global pass indicator, i.e., YES at step S3, pass determinator 154 allows tool recipe 60 to pass to upload or download, at step S10. If tool recipe 60 does not include a global pass indicator 146, i.e., NO at step S3, then pass determinator 154 inhibits passing of tool recipe 60 to upload or download, at step S4. In this latter case, step S4 may also include updater 164 updating a log 180 (FIG. 1) with data regarding the inhibition, and a reason therefor, e.g., no global pass indicator.

Returning to step S2, if an associated PVS template 136 exists, i.e., YES at step S2, then at step S5, audit determinator 153 determines whether PVS template 136 includes an auditable corresponding parameter 138 for at least one parameter 64 of tool recipe 60. That is, audit determinator 153 determines whether PVS template 136 includes any corresponding parameters 138 considered sufficiently relevant to evaluate prior to verification. If NO at step S5, the lack of auditable corresponding parameters 138 indicates that tool recipe 60 does not warrant verification analysis. In this case, tool recipe is passed to upload/download at step S10.

Returning to step S5, if an auditable corresponding parameter 138 is included in associated PVS template 136, i.e., YES at step S5, then at steps S6–S10, verifier 156 determines whether to verify tool recipe 60. In step S6, comparator 158 of verifier 156 compares each parameter 64 of tool recipe 60 having an auditable corresponding parameter 138 to the respective auditable corresponding parameter 138 of associated PVS template 136 to determine whether any non-matching parameter sets exist. A "non-matching parameter set" includes a parameter 64 of tool recipe 60 that does not match a respective auditable corresponding parameter 138 of associated PVS template 136. In FIGS. 3 and 4, for example, parameter 2 and auditable corresponding parameter 2 have non-matching values, and hence constitute a non-matching parameter set. What constitutes a "match" may be user-defined, and may include, for example, an exact match between values, a value of the parameter falling within a range of the corresponding value of associated PVS template 136, a range of values of the parameter falling within a range of the corresponding value of associated PVS template 136, any of the above occurring within a user-defined tolerance, or some other user-defined manner.

If all parameters 64 of tool recipe 60 having auditable corresponding parameters 138 match their respective auditable corresponding parameters 138 of associated PVS template 136, i.e., YES at step S6, then at step S10, verifier 156 verifies tool recipe 60 and allows tool recipe 60 to pass to upload or download. That is, in the case that no non-matching parameter sets exist, tool recipe 60 is verified. However, in the case that at least one non-matching parameter set exists, i.e., NO at step S6, then, at step S7, modifiability determinator 160 determines whether parameter 64 of all of the non-matching parameter sets are indicated as modifiable in associated PVS template 136. As described above, each associated PVS template 136 includes a modifiability indicator 142 for each corresponding parameter 138 for which parameter 64 in tool recipe 60 can be modified. In the case that not all of parameters 64 of the non-matching parameter sets are modifiable, i.e., NO at step S7, then at step S8, verifier 156 inhibits verification of tool recipe 60. In addition, at step S8, updater 164 may update log 180, including a reason for inhibiting verification, e.g., not all non-matching parameters are modifiable.

Returning to step S7, in the case that all of parameters 64 of the non-matching parameter sets are modifiable, i.e., YES at step S7, modifier 160 modifies all parameters 64 of the non-matching parameter sets to match the respective auditable corresponding parameter 138, at step S9. For example, parameter 2 in FIG. 3 would be modified to have a value that falls within the range set for auditable corresponding parameter 2, i.e., between 10–20 mA. In addition, at step S9, updater 164 may update log 180, e.g., to include an indication of which parameters 64 in tool recipe 60 were modified. Subsequently, at step S10, verifier 156 verifies tool recipe 60 and allows tool recipe 60 to pass to upload or download.

It is understood that the above-described embodiments can be utilized in many areas of manufacturing, research and development and tool control other than the illustrative semiconductor fabrication industry. In addition, it is understood that the order of the above-described steps is only illustrative. To this extent, one or more steps can be performed in parallel, in a different order, at a remote time, etc. Further, one or more of the steps may not be performed in various embodiments of the invention.

While shown and described herein as a method and system for verifying tool recipe 60, it is understood that the invention further provides various alternative embodiments. For example, in one embodiment, the invention provides a computer-readable medium that includes computer program code to enable a computer infrastructure to verify tool recipe 60. To this extent, the computer-readable medium includes program code, such as verification system 106 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 1) and/or storage system 122 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Application Service Provider, could offer to verify tool recipe 60 as described above. In this case, the service provider can manage (e.g., create, maintain, support, etc.) a computer infrastructure, such as computer infrastructure 102 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for verifying tool recipe 60. In this case, a computer infrastructure, such as computer infrastructure 102 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of verifying a tool recipe, the method comprising the steps of:
   intercepting the tool recipe during an uploading of the tool recipe from a tool recipe creator or a downloading of the tool recipe from a recipe management system, wherein the tool recipe includes at least one parameter;
   determining whether an associated parameter verification set (PVS) template for the tool recipe exists;
   in the case that the associated PVS template exists, determining whether the PVS template includes an auditable corresponding parameter for at least one parameter of the tool recipe;
   in the case that the associated PVS template includes the auditable corresponding parameter, determining whether to verify the tool recipe by:
      comparing each parameter having an auditable corresponding parameter to the auditable corresponding parameter of the associated PVS template to determine whether any non-matching parameter sets exist,
      verifying the tool recipe in the case that no non-matching parameter sets exist,
      determining, in the case that at least one non-matching parameter set exists, whether the parameter of all of the non-matching parameter sets are indicated as modifiable in the associated PVS template, and in the case that not all of the parameters of the non-matching parameter sets are modifiable, inhibiting verification of the tool recipe, and modifying, in the case that all of the parameters of the non-matching parameter sets are modifiable, all the parameters of the non-matching parameter sets to match the auditable corresponding parameter and verifying the tool recipe.

2. The method of claim 1, further comprising the step of determining whether the tool recipe includes a global pass indicator in the case that the associated PVS template does not exist.

3. The method of claim 2, further comprising the step of inhibiting the uploading or downloading of the tool recipe in the case that the tool recipe does not include the global pass indicator.

4. The method of claim 3, further comprising the step of updating a log with data in the case that uploading or downloading was inhibited, and a reason therefor.

5. The method of claim 1, further comprising the step of:
   updating a log in the case that the tool recipe verification is inhibited, including a reason for inhibiting verification; and
   updating the log in the case that all of the parameters of the non-matching parameter sets are modified, including an indication as to which parameters were modified.

6. The method of claim 1, wherein the tool recipe creator performs one of: creating the tool recipe and modifying the tool recipe.

7. The method of claim 1, wherein at least one parameter is stated in terms of a range.

8. A system for verifying a tool recipe, the method comprising the steps of:
an interceptor for intercepting the tool recipe during an uploading of the tool recipe from a tool recipe creator or a downloading of the tool recipe from a recipe management system, wherein the tool recipe includes at least one parameter;
a template determinator for determining whether an associated parameter verification set (PVS) template for the tool recipe exists;
an audit determinator for determining, in the case that the associated PVS template exists, whether the associated PVS template includes at least one auditable corresponding parameter; and
a verifier for determining whether to verify the tool recipe in the case that the associated PVS template includes the at least one auditable corresponding parameter, by:
comparing each parameter having an auditable corresponding parameter to the auditable corresponding parameter of the associated PVS template to determine whether any non-matching parameter sets exist,
verifying the tool recipe in the case that no non-matching parameter sets exist,
determining, in the case that at least one non-matching parameter set exists, whether the parameter of all of the non-matching parameter sets are indicated as modifiable in the associated PVS template, and in the case that not all of the parameters of the non-matching parameter sets are modifiable, inhibiting verification of the tool recipe, and modifying, in the case that all of the parameters of the non-matching parameter sets are modifiable, all the parameters of the non-matching parameter sets to match the auditable corresponding parameter and verifying the tool recipe.

9. The system of claim 8, further comprising a pass determinator for determining whether the tool recipe includes a global pass indicator in the case that pass determinator determines that the associated PVS template does not exist.

10. The system of claim 9, wherein the verifier inhibits the uploading or the downloading of the tool recipe in the case that the pass determinator determines that the tool recipe does not include the global pass indicator.

11. The system of claim 10, further comprising an updater for updating a log with data in the case that uploading or downloading was inhibited, and a reason therefor.

12. The system of claim 8, further comprising an updater for:
updating a log in the case that the tool recipe verification is inhibited, including a reason for inhibiting verification; and
updating the log in the case that all of the parameters of the non-matching parameter sets are modified, including an indication as to which parameters were modified.

13. The system of claim 8, wherein the tool recipe creator performs one of: creating the tool recipe and modifying the tool recipe.

14. The system of claim 8, wherein at least one parameter is stated in terms of a range.

15. A program product stored on a computer-readable medium, which when executed, verifies a tool recipe, the program product comprising:
program code for intercepting the tool recipe during an uploading of the tool recipe from a tool recipe creator or a downloading of the tool recipe from a recipe management system, wherein the tool recipe includes at least one parameter;
program code for determining whether an associated parameter verification set (PVS) template for the tool recipe exists;
program code for determining whether, in the case that the associated PVS template exists, the associated PVS template includes at least one auditable corresponding parameter; and
program code for determining whether to verify the tool recipe in the case that the associated PVS template includes the at least one auditable corresponding parameter, by:
comparing each parameter having an auditable corresponding parameter to the corresponding parameter of the associated PVS template to determine whether any non-matching parameter sets exist,
verifying the tool recipe in the case that no non-matching parameter sets exist,
determining, in the case that at least one non-matching parameter set exists, whether the parameter of all of the non-matching parameter sets are indicated as modifiable in the associated PVS template, and in the case that not all of the parameters of the non-matching parameter sets are modifiable, inhibiting verification of the tool recipe, and modifying, in the case that all of the parameters of the non-matching parameter sets are modifiable, all the parameters of the non-matching parameter sets to match the auditable corresponding parameter and verifying the tool recipe.

16. The method of claim 15, further comprising program code for determining whether the tool recipe includes a global pass indicator in the case that the associated PVS template does not exist.

17. The method of claim 16, wherein the global pass determining program code inhibits the uploading or downloading of the tool recipe in the case that the tool recipe does not include the global pass indicator.

18. The method of claim 17, further comprising program code for updating a log with data in the case that the uploading or downloading was inhibited, and a reason therefor.

19. The method of claim 15, further comprising program code for:
updating a log in the case that the tool recipe verification is inhibited, including a reason for inhibiting verification; and
updating the log in the case that all of the parameters of the non-matching parameter sets are modified, including an indication as to which parameters were modified.

20. The method of claim 15, wherein the tool recipe creator performs one of: creating the tool recipe and modifying the tool recipe.

* * * * *